J. M. Kern,
Hanging Saws,
N° 14,705.     Patented Apr. 15, 1856.
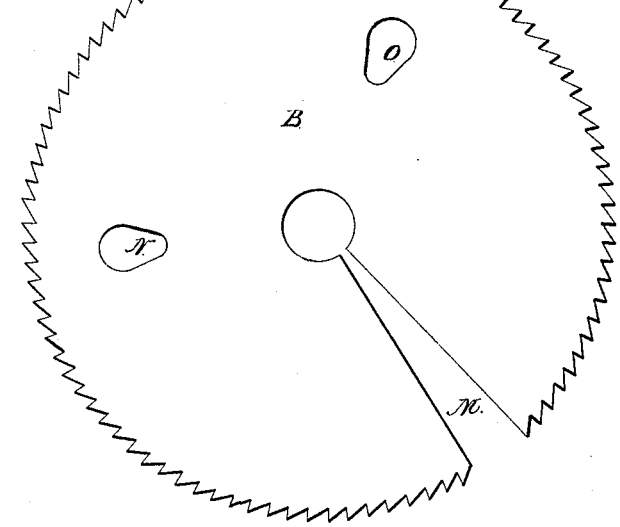
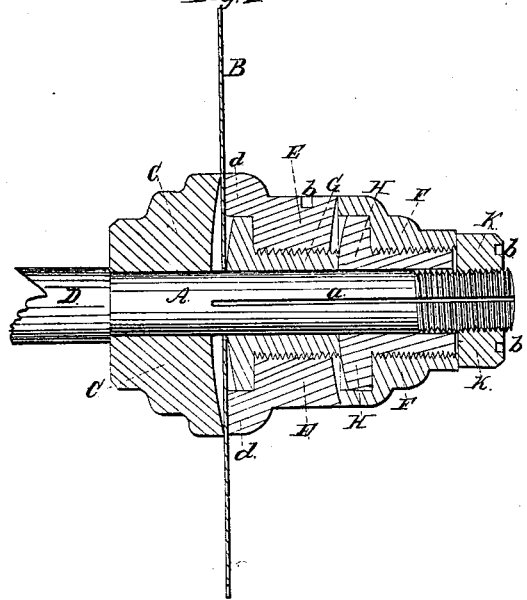
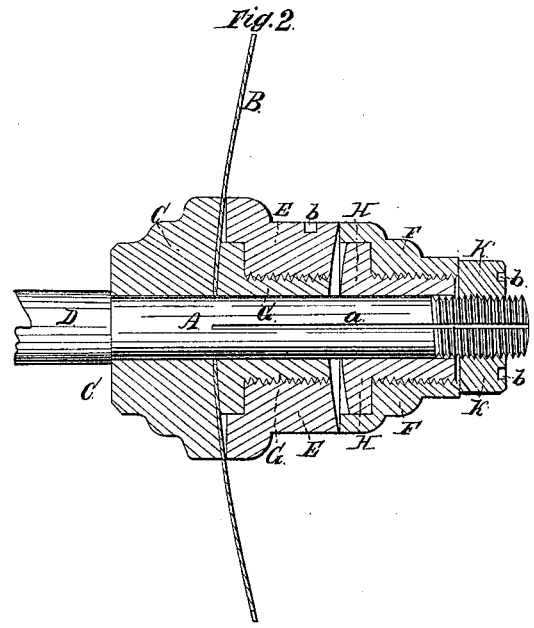

UNITED STATES PATENT OFFICE.

JAMES M. KERN, OF MORGANTOWN, VIRGINIA, ASSIGNOR TO ISAAC SCOTT AND E. P. FITCH.

METHOD OF ADJUSTING CIRCULAR SAWS FOR CONCAVE OR CONVEX WORK.

Specification of Letters Patent No. 14,705, dated April 15, 1856.

*To all whom it may concern:*

Be it known that I, JAMES M. KERN, of Morgantown, in the county of Monongalia and State of Virginia, have made new and useful Improvements in the Manner of Hanging Circular Saws so as to Change Them from Disk to Concave Without Taking Them from Their Shafts; and I do hereby declare that the following is a full and exact description thereof, reference being had to the accompanying drawings, in which,—

Figure 1, represents a longitudinal section through the shaft and followers, showing a plain or disk shaped circular saw in a cross section. Fig. 2, a similar longitudinal section with a different arrangement of the followers showing a concave circular saw in a cross section. Fig. 3, a front view of a circular saw to be used as plain or spherical saw.

The nature of my invention consists in so arranging a plain circular saw on its shaft by means of followers, screws and nuts, as that by a slight alteration in the relative position of said followers screws and nuts, it may be converted into a dish-shaped or concave circular saw, and that this may be done without causing any buckling or unevenness in the cutting edge, or removing any of the parts from the shaft.

To enable others skilled in the art to make and use my invention, I will proceed to describe its construction and operation.

A represents the shaft on which the circular saw B, is to be operated; a stationary plate C is permanently fixed on said shaft by means of keys or otherwise and kept from moving lengthwise by bearing against the shoulder D. The side of the plate C, which faces the saw is concave or spherically shaped as represented in Fig. 1, and this at its edge only touches the saw. To fasten the saw in its proper place the followers E and F, which as hereafter described can slide on the shaft A, are pressed against the saw by tightening the screw nut K. If it is only desired to use this saw as a plain circular one, then the followers which are here composed of four pieces E, F, G, and H, may consist of one solid piece, but as this arrangement serves to convert this plain saw into one of the shape of a dish, this operation can be readily performed as follows:

In the shaft A is cut a groove $a$, parallel to its axis, in which runs a feather projecting from the inner circumferences of the followers G and H, so that they can slide on said shaft lengthwise, but not turn on the same. They are provided on their outer circumferences with screw threads, onto which the hollow followers E and F can be screwed. The surface of the followers G and H, facing the saw are convex or spherically shaped, and correspond inversely with the concave of the plate C. The end of the follower E facing the saw is even, and thus the plain circular saw, is held between the circular edge of the plate C, and the even side of the follower E.

To convert this saw into a dish shaped one it is only required to turn the follower E, from the right to the left, or to unscrew it by inserting a wrench into the cavities $b$; the inner followers will remain stationary, but the outer followers E and F together with the screw nut K, will be unscrewed until the end of the follower E, arrives at the line $d$ marked in red, then by holding the followers E and F fixed, and screwing down the nut K, they will assume the position shown in Fig. 2, and the saw being operated upon by the convex follower G, is plunged into the concave of the plate C.

It is obvious that if this circular saw were of the common construction, it could not be bent easily, and could not afterward present an even cutting edge; to give the saw sufficient play in bending the space M, is cut out thus permitting the saw to assume a slight conical shape only, but as it is required that a dish shaped saw, as described ought to be rather of a spherical than conical shape, it is necessary to permit play for that motion; and I have found that by providing the saw with two perforations N and O, such as shown in Fig. 3, and in places about equidistant from the space M, sufficient play and elasticity may be imparted to the metal to shape itself according to the concave and follower, and to assume the shape, as represented in Fig. 2.

Having thus fully described the nature of my invention and shown its operation, I would state that saws have been so arranged that greater or less concavity may be given to them. And the saw has been cut from the eye to the rim, so that it may be sprung into a dished form. I do not claim either of these things, but What I do claim as new and desire to secure by Letters Patent is, So arranging a circular saw with its followers, upon a shaft, as that said saw may be converted from a disk to a concave saw, or vice versa, without removing any of the parts from the shaft, as herein set forth.

JAMES M. KERN.

Witnesses:
   JOHN HOWELL,
   JOHN FORDYCE.